United States Patent [19]
Worthington et al.

[11] Patent Number: 5,881,270
[45] Date of Patent: Mar. 9, 1999

[54] METHOD FOR FLEXIBLE SIMULATION MODELING OF MULTI-COMPONENT SYSTEMS USING A GLOBAL MAILBOX TO FACILITATE COMMUNICATION BETWEEN DISCRETE COMPONENT MODELS

[75] Inventors: Bruce Lee Worthington, Austin; Colette Mary Donnelly, Pflugerville, both of Tex.

[73] Assignee: International Business Machines Corporation, Armonk, N.Y.

[21] Appl. No.: 951,346

[22] Filed: Oct. 16, 1997

Related U.S. Application Data

[63] Continuation of Ser. No. 846,863, May 1, 1997.
[51] Int. Cl.$^6$ .................................................. G06F 15/46
[52] U.S. Cl. .................... 395/500; 395/500; 395/200.56; 395/183.14; 364/489; 364/490
[58] Field of Search .................................... 364/490, 489; 395/500, 183.14

[56] References Cited

U.S. PATENT DOCUMENTS

| | | | |
|---|---|---|---|
| 4,851,988 | 7/1989 | Trttier et al. | 364/200 |
| 5,197,016 | 3/1993 | Sugimoto et al. | 364/490 |
| 5,544,067 | 8/1996 | Rostoker et al. | 364/489 |
| 5,694,539 | 12/1997 | Haley et al. | 395/183.14 |
| 5,742,825 | 4/1998 | Mathur et al. | 395/680 |

*Primary Examiner*—Kevin J. Teska
*Assistant Examiner*—M. Irshadullah
*Attorney, Agent, or Firm*—Jeffrey S. Labaw; David H. Judson

[57] ABSTRACT

A methodology for allowing component models to be developed independently and allowing a user to select and connect a set of models into a desired multi-component configuration at run-time. The component models are built free from inter-model dependencies, thereby enhancing flexibility and reuse. The component models conform to a standard interface for initialization (prior to simulation run) and inter-model communication (prior to and during a simulation run).

19 Claims, 7 Drawing Sheets

METHOD FOR FLEXIBLE SIMULATION MODELING OF MULTI-COMPONENT SYSTEMS USING A GLOBAL MAILBOX TO FACILITATE COMMUNICATION BETWEEN DISCRETE COMPONENT MODELS

This application is a continuation of prior U.S. Ser. No. 08/846,863, filed May 1, 1997.

BACKGROUND OF THE INVENTION

1. Technical Field

The present invention relates generally to software tools used to model the behavior of complex systems.

2. Description of the Related Art

Complex systems are typically built from many discrete components. In a given field of interest, different systems often utilize many of the same components. Computer systems are a classic example. Such systems are designed and built from many discrete system components including, without limitation, processors, caches, memories, buses, bridges, adapters and peripherals. Building and analyzing models of such complex systems provides insight into the behavior of such systems.

In the prior art, it is known to build models of a small number of components of a given computer domain (e.g., a network) and then to use such component models for the purpose of analyzing or predicting the effects of individual components on system performance. Such schemes, however, are limited in their applicability to the particular domain for which the component models are designed. These known techniques do not afford a methodology or the tools necessary to enable complete "end-to-end" system modeling wherein a model may represent any complex system from a small subsystem up to an entire multiprocessor/multicomputer network. Another prior art approach is to model from a "system-centric" or top-down approach, whereby particular components of a system configuration are modeled with system-wide dependencies. In the latter approach, individual system components are not "isolated" from each other in the system model and thus are interdependent. Individual component models are rarely reusable to any significant extent in other system models. Therefore, the usefulness of the overall system model is limited to a specific subset of configurations.

There has been a long-felt need in the art to provide fully "end-to-end" system models using individual system component models or modules that are truly independent and that may be seamlessly connected in a building block fashion. This invention is directed to solving this important problem.

SUMMARY OF THE INVENTION

It is thus a primary object of the invention to provide a method for dynamically building complex system models from discrete, independent, reusable component models.

It is another primary object of this invention to connect discrete, independent and reusable component models in a dynamically-specified user configuration to facilitate, for example, performance and reliability modeling.

It is still another primary object to provide a modeling infrastructure allowing complex system models to be dynamically constructed from a library of discrete, independent, and reusable component models.

Another more general object of this invention is to provide a flexible simulation modeling technique for multi-component systems.

Yet another general object is to build system models from independent and reusable component modules.

Still another important object of this invention is to provide a tool for fully end-to-end system modeling using a modular approach to modeling each system component.

It is another object of the invention to provide standardized interface specifications for component models contributed to a library of such models and wherein multiple components are selected in order to build and analyze a multi-component system.

Another object is to allow component models to be developed independently by third parties and then allowing a user to select and connect a particular set of such models into a desired configuration, wherein the connection occurs only at run-time to thereby protect third party intellectual property embedded in the component models.

It is a more general object to enhance simulation modeling techniques in order to reduce the time and expense needed to develop new products.

These and other objects are provided in a system modeling infrastructure that enables a desired system configuration model to represent any complex system, for example, from a small subsystem up to an entire multiprocessor/multicomputer network. The infrastructure provides the necessary code and interfaces that, in effect, "glue" or bind individual component models into a user-specified system configuration on a component to component, subsystem to subsystem, and system to system basis.

According to the invention, the infrastructure comprises a library of discrete and reusable component models, a System_Main module and a Global_Registry module. The component models are independent, thereby preserving a "building-block" or object-oriented modeling methodology. Each component preferably comprises an object file that is not executable in and of itself. The System_Main module is responsible for initializing the individual components and connecting them in the desired configuration as specified by the user. The Global_Registry module supports various data structures visible to all components as well as certain procedures (i.e. resources) for implementing control actions. Preferably, all modules are compiled and linked together into an executable at run-time to create the desired configuration undergoing analysis.

The infrastructure provides for runtime configuration flexibility. Both the configuration of the individual components and their interconnection is specified at runtime. AS long as any required system component module is linked into the executable file, the user is free to reconfigure the components or their interconnection between simulation runs. Moreover, because individual component models (in the form of object files) may be linked into the executable without source code, confidentiality of the actual workings of a given component may be maintained. In effect, the methodology facilitates "black-box" component modeling with respect to any overall system model.

According to a preferred embodiment, a method of modeling a system configuration makes use of a library of discrete component models each conforming to a predefined interface specification. The method begins by registering each component model with a registry to generate a global list of unique identifiers accessible to all discrete component models. In response to user-selection of a system configuration to be modeled, a first set of discrete component models necessary to model the system configuration are "selected." A second set of discrete component models (that are unnecessary to model the system configuration) are "de-selected" to conserve system resources during the subsequent run-time simulation. After verifying the availability of the first set of component models and ensuring that the selection and de-selection processes worked successfully, the simulation is carried out. Preferably, communications between models (and the various control routines) are based upon a message-passing scheme using a global "mailbox" or pool to which models post and/or retrieve messages.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
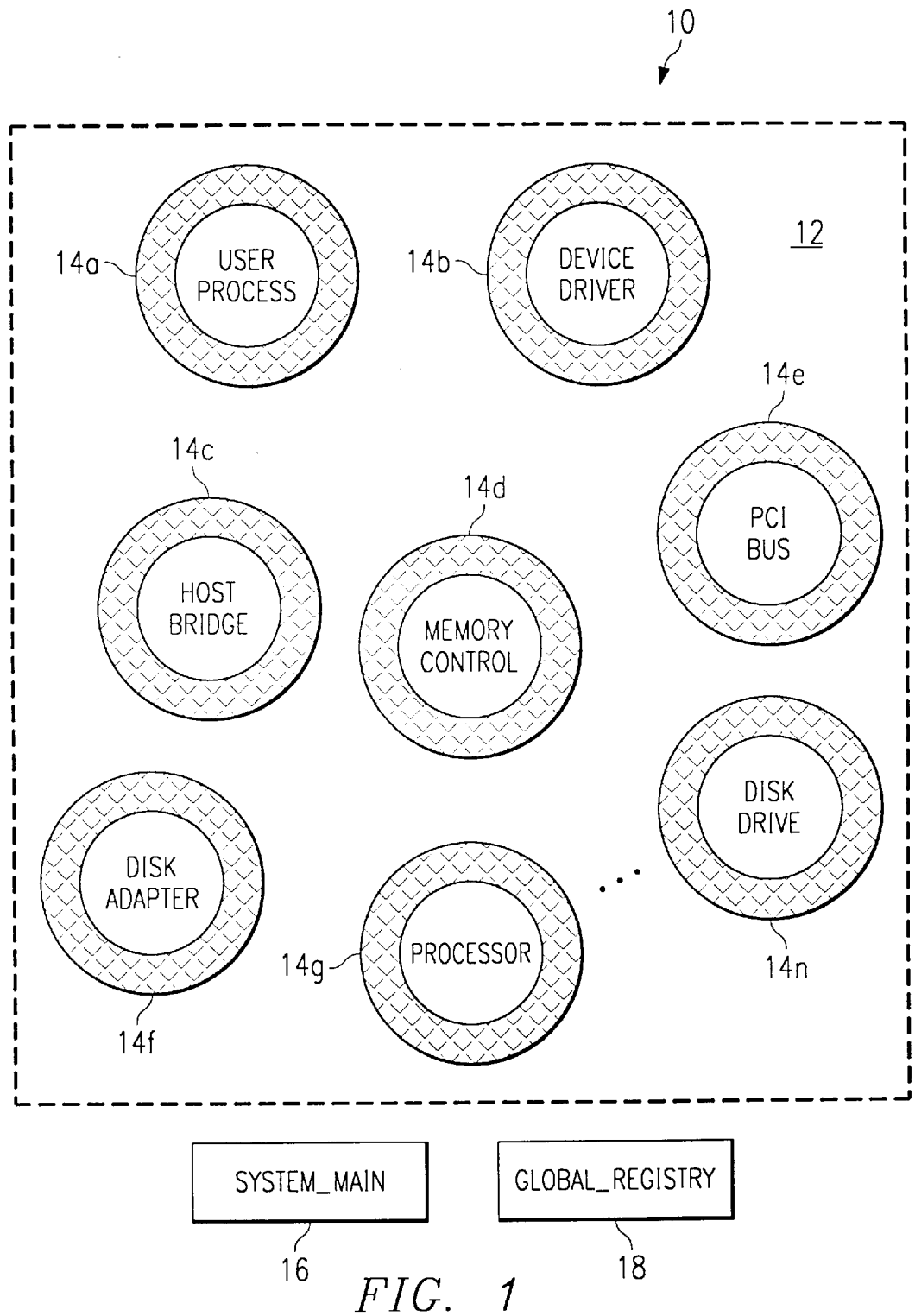
FIG. 1 is a block diagram of the system modeling infrastructure of the present invention which includes a set of discrete, independent, reusable component models that may be combined into a dynamically-specified configuration.

Referring now to FIG. 1, a high level block diagram is shown of the system modeling infrastructure 10 of the present invention. As noted above, the infrastructure allows complex system models to be dynamically constructed from a library 12 of discrete, independent, reusable component models 14a . . . 14n. Preferably, the component models are designed and built free from inter-model dependencies (i.e. an individual component model does not rely on other component models). In the exemplary embodiment, a system model is a computer system, although it should be appreciated that the principles of the present invention are not limited to modeling or simulating computer-related systems. Indeed, the methodology of the present invention applies equally well to the modeling of any complex system, whether physical or otherwise (including, for example, the modeling of complex business operations). Thus, according to the present invention, a user-specified system model may comprise any connected or connectable set of discrete, independent component models (sometimes referred to as "modules"), irrespective of any particular application. Moreover, the infrastructure does not make use or exploit the particular functionality of individual component modules; thus, it is envisioned that such modules may (and often will) be supplied from third parties to the user as compiled (but non-executable) object files (to protect embedded intellectual property).

One of ordinary skill will further appreciate that the modeling infrastructure may be put to varying uses. For example, the infrastructure may be used to assist in the development and execution of performance evaluation experiments to predict behavior characteristics of given system configurations. It may also be used to create reliability models into which faults may be injected to evaluate system performance. These examples, of course, are merely representative.

AS seen in FIG. 1, modeling infrastructure 10 also includes a System_Main component 16 and a Global_Registry component 18. The System_Main component 16 receives the user-specified system configuration as an input and selects the corresponding system component models for a given simulation run. The Global_Registry component 18 comprises a number of control routines and data structures that facilitate management of the individual component models. According to the present invention, each component model 14 conforms to a standard interface (defined by the Global_Registry and its functionality) to facilitate initialization of component modules (prior to a simulation run) and inter-model communication (prior to and during a simulation run).

Figure 2:
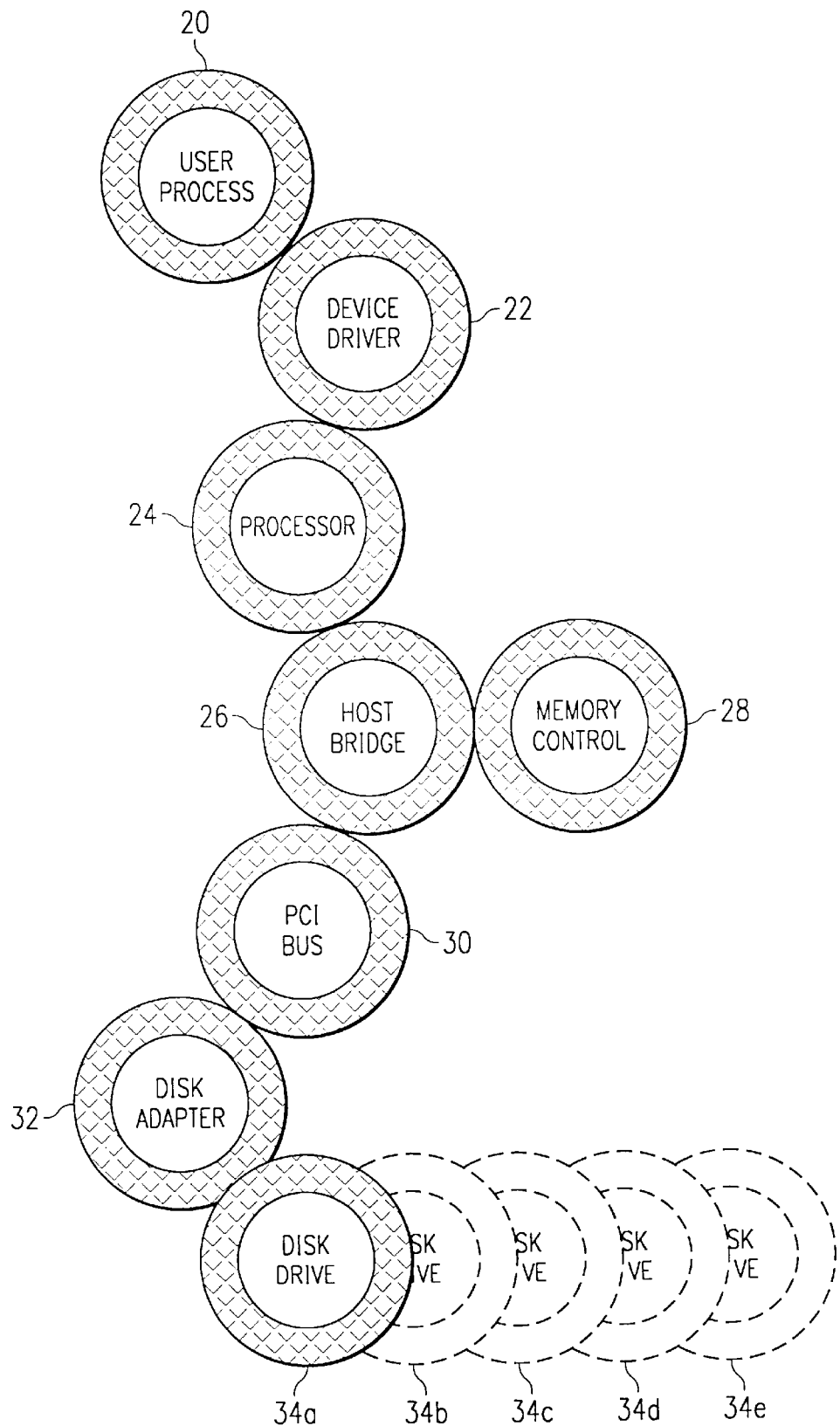
FIG. 2 is a block diagram of a representative system configuration using the set of discrete component models of FIG. 1.

FIG. 1 illustrates the various component modules as "disconnected" or in a free associated state. This "library" of modules or, more typically, some subset thereof, is then "connected" into a system configuration for modeling a given component, subsystem, system or other "abstraction." FIG. 2 represents a "connected" set of component models that has been specified by a given user-supplied system configuration to the System_Main component as discussed above. This system configuration includes a User Process 20, a Device Driver 22, a Processor 24, a Host Bridge 26, a Memory Controller 28, a PCI Bus 30, a Disk Adapter 32 and several "instances" 34a–34e of a Disk Drive. Certain models are shown to be in "contact" with each other, which represents how the devices would actually interface in the system configuration.

Figure 3:
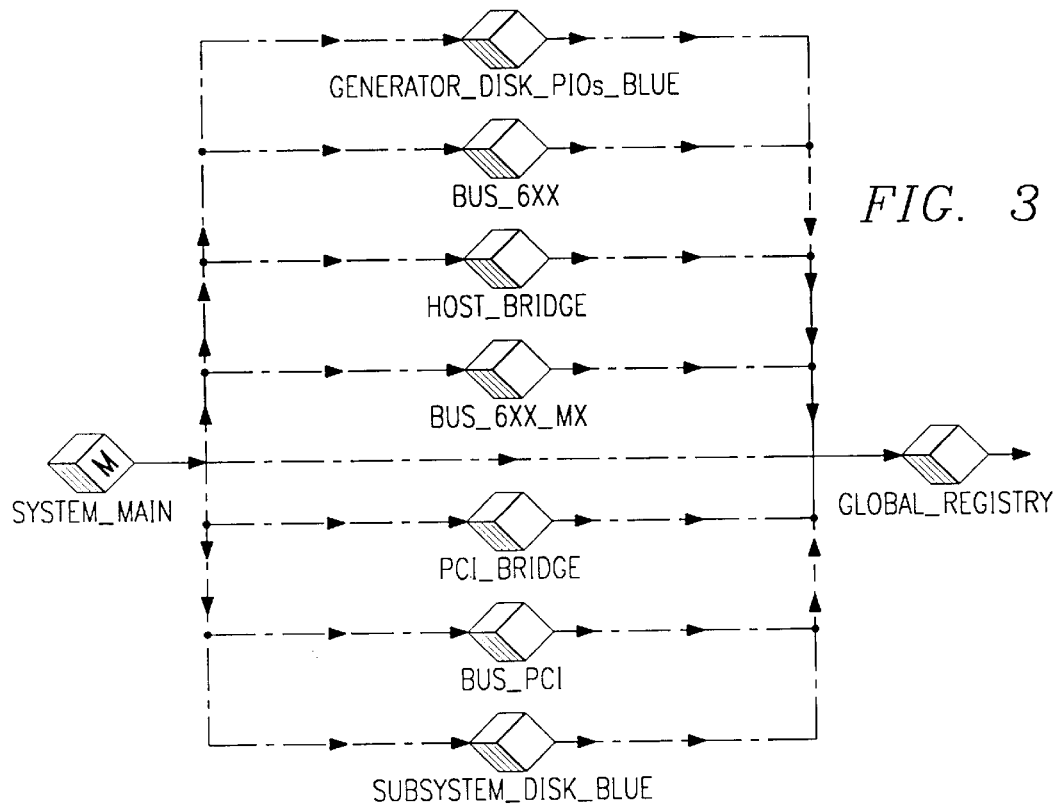
FIG. 3 illustrates a directed graph of the various object files that comprise a library of component modules that are linked together to generate an executable according to the present invention.

According to the invention, each of the component models are compiled into object files (e.g., ".o" files) that, preferably are not executable independently. Rather, these object files (in other words, the component modules) reach execution form only when linked with System_Main. Generally, and as illustrated in the directed graph of dependency arcs in FIG. 3, the Global_Registry processes are compiled first, after which each component module gets compiled into an object file (not executable). The entire "set" becomes executable only after linking with System_Main, which resolves all links to create a run-time "executable" for a given simulation run. The actual linking process is carried out by a linker, in a known manner. In this way, the user need not recompile the entire system configuration model each time a new component model (namely, a new object file) is created or an existing model is modified or added into the system model. This "black box" technique provides the further advantage of encapsulating the "functionality" of the component model to thereby mask intellectual property embedded in the component model. Of course, the invention may be practiced using previously compiled and linked executable modules stored in a class library.

Thus, according to the preferred aspects of this invention, each component model is compiled in conjunction with a set of "global" routines (part of Global_Registry) and, as will be described, controlled in conjunction with certain data structures. These routines and data structures are now described and illustrated in detail.

The infrastructure illustrated in FIG. 1 is preferably implemented in software running on a computer having a conventional input devices. These include a keyboard and a display. A user specifies a system configuration in any known manner, for example, by entering ASCII text data on a menu or by entering data in a point and click method (via a graphical user interface or GUI). The particular entry technique does not matter to the invention. Thus, the simulation session begins by having the user specify, in a very simple text format or via a user-friendly GUI, the configuration of the desired multi-component "system" model that is to be made up of some subset of the available component models of the library arranged in a specific configuration. The following is a representative user-selected system configuration:

```
           Bus_6xx 0
           0 Generator_Disk_PIOs_Blue 0 S 0
           1 Host_Bridge_ . . .     0 S 0
           Bus_6XX_MX 0
           0 Host_Bridge_ . . .     0 S 1
           1 PCI_Bridge_ . . . 0 S 0
           Bus_PCI 0
           0 PCI_Bridge_ . . . 0 S 1
           1 Subsystem_Disk_Blue 0
           2 Subsystem_Disk_Blue 1
           3 Subsystem_Disk_Blue 2
           4 Subsystem_Disk_Blue 3
           5 Subsystem_Disk_Blue 4
           6 Subsystem_Disk_Blue 5
           7 Subsystem_Disk_Blue 6
           8 Subsystem_Disk_Blue 7
           9 Subsystem_Disk_Blue 8
           10 Subsystem_Disk_Blue 9
           11 Subsystem_Disk_Blue 10
```

Figure 3A:
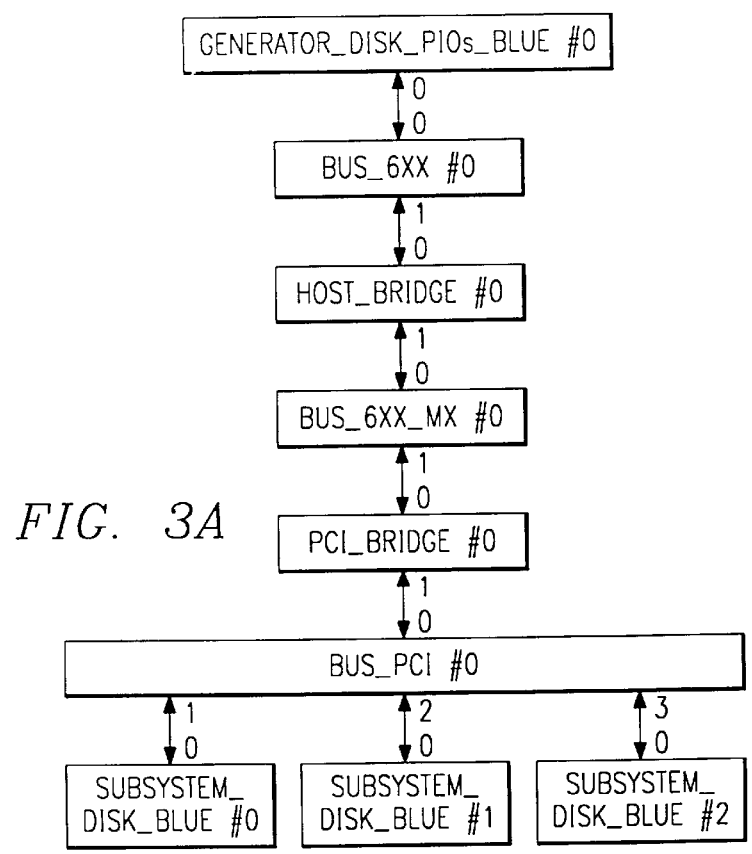
FIG. 3A illustrates the user-specified configuration of models selected from the library of FIG. 3.

This illustrative system configuration thus includes a number of different components, several of which (e.g., the Disk_Blue subsystem) include multiple "instances." FIG. 3A is a graphical representation of this system configuration.

Figure 4:
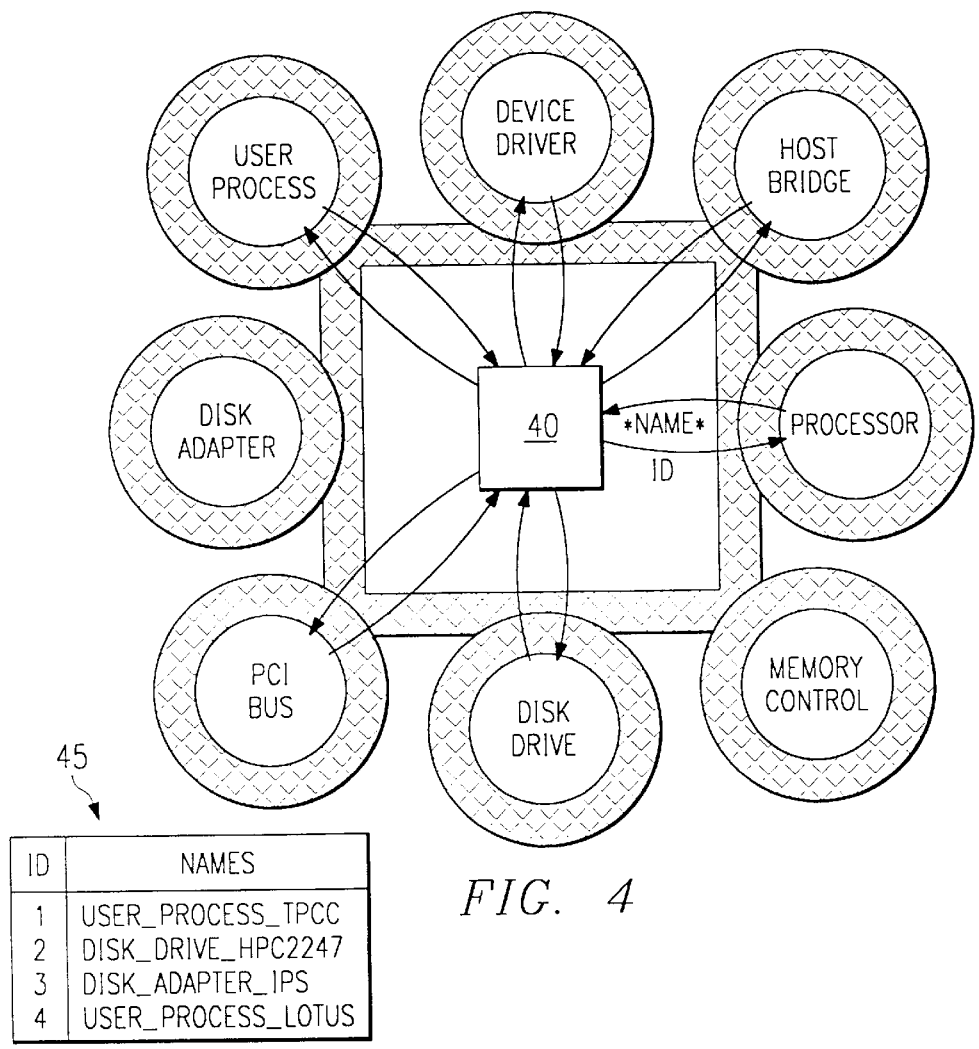
FIG. 4 is a simplified block diagram illustrating registration of the various discrete component models according to the present invention.

FIG. 4 illustrates a "registration" routine 40 that takes place during initialization, i.e. before the user enters a system configuration to be modeled. This global routine is called by every component model as soon as the executable is started. It takes as input the *name* of the component model and returns (to the model) a unique (e.g., an incremented integer) identifier. After each component model has "registered" by calling this routine 40, the mapping of component names to unique identifiers is made visible to all components in the form of a global data structure or "registry" 45 maintained within Global_Registry. The registry 45 is thus a mapping of component model names (generally for all the models in the library) to unique identifiers. This process thus provides dynamic naming registration of preferably all of the component models in the library.

It is now assumed that the user has specified a system configuration to be modeled and that such configuration has been input to System_Main. When the executable is run, System_Main then executes several additional processes which alert the specific component models that they are part of the current "experiment." These processes include a "selection" routine, a "de-selection" routine, a "common component" routine and certain "verification" (or validation) routines. Execution of these routines completes the initialization of the system configuration.

Figure 5:
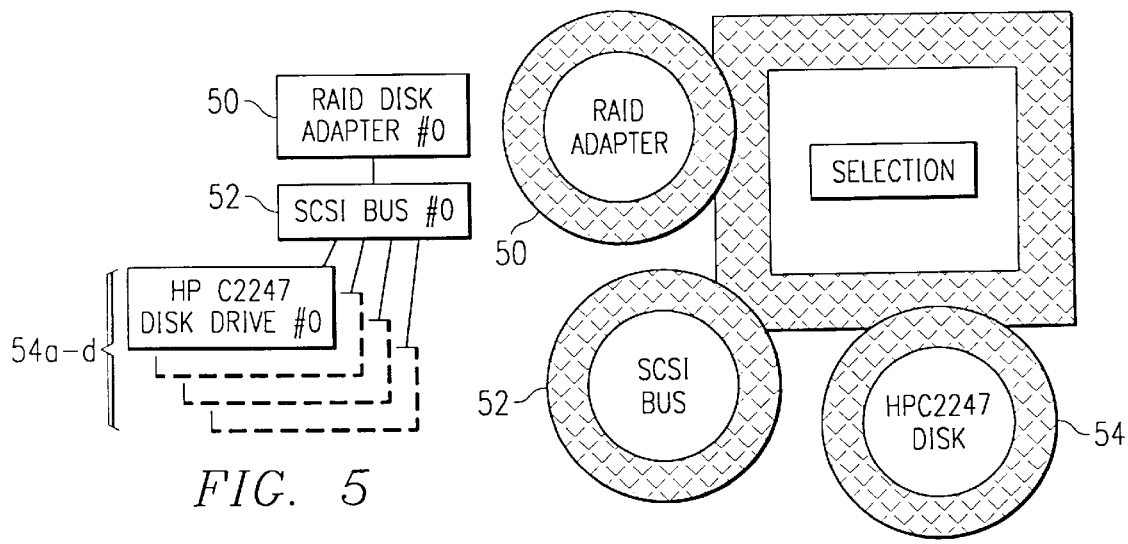
FIG. 5 is a simplified block diagram illustrating selection of particular discrete component models for use in the system configuration.
Figure 6:
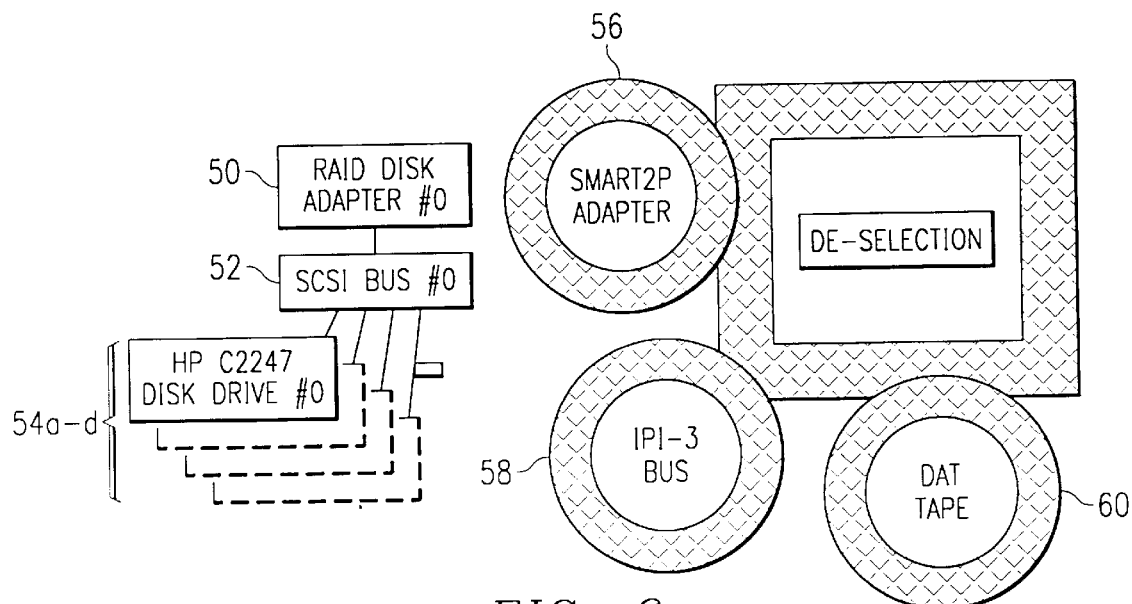
FIG. 6 is a block diagram illustrating de-selection of particular discrete component models that are not necessary for the system configuration.

In particular, as illustrated in FIG. 5, a "first" set of component models that are necessary for the specified system configuration are said to be "selected." On the contrary, and as seen in FIG. 6, a "second" set of component models that are unnecessary for the specified system configuration are "de-selected" to ensure that such models do not consume system resources (during the simulation). Each of these processes is illustrated with representative examples merely for discussion purposes. Thus, for example, in FIG. 5 it is assumed that the desired configuration for the given experiment requires an RAID Disk Adapter #0 50, SCSI Bus #0 52 and four (4) instances of HP C2247 Disk Drive #0 54a–54d. The "selection" process, in effect, "wakes up" each of these entities and informs them that they will be included in the user-selected configuration. AS previously noted, each such entity is preferably a discrete component model built without dependencies on other entities to be used in the system configuration. FIG. 6 illustrates the corresponding de-selection process with respect to SMART2 Adapter 56, IPI-3 Bus 58 and DAT Tape Drive 60 (collectively, the second set of component models) being de-selected.

Thus, as illustrated in FIG. 6, after selecting an arbitrary number (the first set) of component models from the "library" to build a complex system model of a specific configuration, at least some (and preferably all) component models not included are "de-selected" so they can release any memory or other resources (e.g., threads) that will not be needed for the current experiment. The de-selection process code alerts the specific component models not included that they are not needed for the current experiment. Each such component then releases any resources (e.g., memory or threads) that will not be necessary for the current experiment. This de-selection process thus improves the efficiency of the simulation run.

Figure 7:
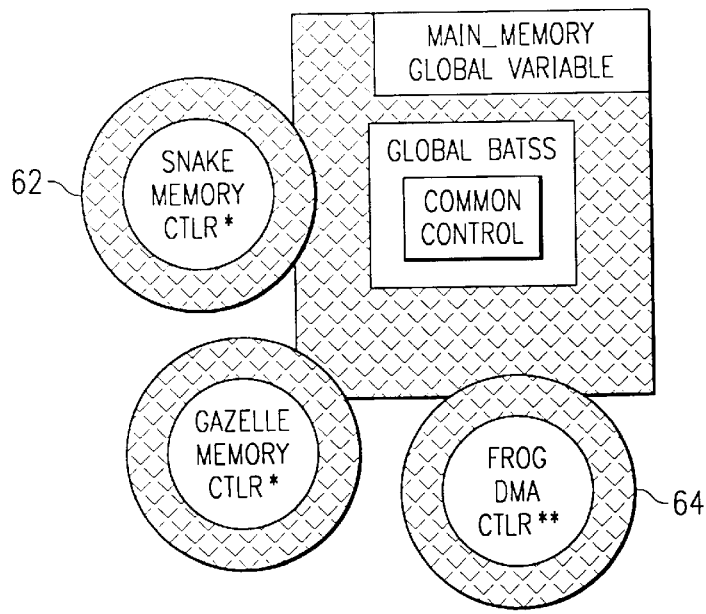
FIG. 7 is a block diagram illustrating a common role assignment process of the present invention.

Referring now to FIG. 7, the "common component" process of the Global_Registry is now described. By way of brief background, when a set of independent component models that are to be used to create a multi-component (i.e., system) model, one or more of the component models may take on a "common" role (e.g., main memory) at some fairly high level degree of abstraction. For example, if there is a DMA controller component model that expects to access "main memory" for its activities, this model needs to know what other component is taking on that role. If, however, there are two or more potential memory controller components in the "library" of component models, the DMA controller component model does not know in advance which one will be included in the desired system configuration. The present invention addresses this problem by having one of the component models take on the "common role" to the exclusion of the other component models.

This is achieved as shown in FIG. 7. Continuing the example above (but merely for illustrative purposes), it is assumed that the desired configuration for the given experiment includes the Snake Memory Controller 62 and the Frog DMA Memory Controller 64. An alternate choice for the memory controller would be the Gazelle Memory Controller 66. When one of the available memory controller component models (e.g., controller 62) receives a message that it is included in the currently desired configuration, it sets a global variable "MAIN_MEMORY" to its unique ID as specified in the registry 45. The DMA Controller 64 which is also part of the currently-desired configuration, can access that global variable to determine what component model is taking on the "common" role of main memory. That controller then uses the global variable MAIN_MEMORY during the actual run-time simulation.

Generalizing, according to the invention, a "subset" of discrete component models that would have an identical role (at some high level degree of abstraction) in a desired system configuration are identified. One of the subset of discrete components is then selected to assume the role to the exclusion of the other members of the subset. That component then globally identifies itself (by setting a global variable maintained by Global_Registry) and assumes the role. Other implementations of identifying components taking on common roles are possible, for example, such a component could broadcast a message to other components stating its intention.

Figure 8:
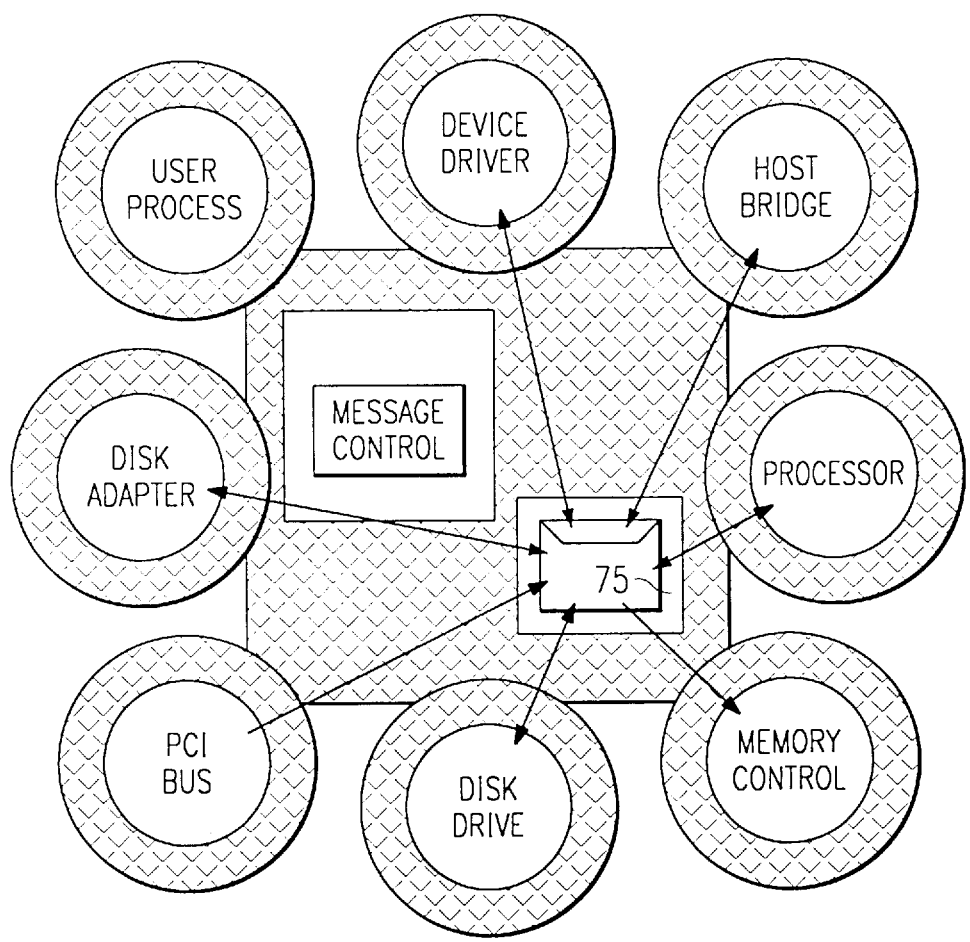
FIG. 8 is a block diagram illustrating how components communicate with each other using a globally-visible mailbox.

Following selection, de-selection and common control role assumption as illustrated in FIGS. 5–7, System_Main verifies that the system configuration is valid. Typically, this verification involves several steps. Before describing those steps, it is first necessary to describe another important data structure implemented and maintained by Global_Registry, which is referred to herein as a global mailbox or "pool." This concept is illustrated in FIG. 8.

When the component models have been selected from the "library," the independent models (i.e. their instances) need to be able to communicate with each other both prior to (i.e., during initialization) and during the simulation. In order to keep the component models independent of each other, this communication must be enabled without any prior knowledge of desired configuration of component model instances. When the executable is run, it reads in the user-specified configuration as previously described. The System_Main includes code to alert the specific component models that they are part of the current experiment (through the "selection" process) and to specify the particular "location" of each instance of the component in the desired configuration. Each instance of a component is directly connected to one or more instances of some component model, namely, its immediate "neighbor(s)." Moreover, as described above, during the registration process, each component model linked into the final executable has a unique address in the registry 45.

According to the invention, "neighbors" can communicate with each other both before and during the actual simulation by sending "messages" through a globally accessible "mailbox" or pool 75. Each component watches for messages addressed to its unique component address that are placed in the global mailbox 75. The global mailbox is quite advantageous as it provides a simple vehicle by which independent component models may communicate with each other. This obviates use of dedicated mailboxes for each component. Preferably, the message format identifies the specific instance of the component for which the message is intended.

Messages are thus "addressed" using the unique per-model identifiers obtained during the registration process. Message-passing according to the invention may take place using any of a number of different implementations including, without limitation, calls to a router routine, waking up a dispatcher thread, placing data in memory locations that are polled by the individual components (looking for appropriately addressed messages), and the like. The global mailbox approach facilitates the provision of a common "Interface" among the discrete, independent component models.

As previously noted, the invention also includes a mechanism for determining whether one or more of the models selected is missing from the "library." This operation preferably occurs after the user specifies the configuration of the desired multi-component "system" model. In the preferred embodiment, the process of "alerting" the specific component models is done during the selection process via the global mailbox of FIG. 8 and a message-passing technique. Thereafter, a check is made to make sure that every such message has been accepted by a component model. If messages remain outstanding, this status may indicate that a component model has not been included into the "library" or that it has been incorrectly coded and cannot accept the inclusion "messages." In this simple way, component models that are missing from the library are detected.

Alternatively, validation is effected by verifying that the selection and/or de-selection process worked successfully. In a preferred embodiment, this is achieved by testing to determine that all component models pick up their messages from the global mailbox 75 within a given period of time before initiating the simulation run. If a particular component mailbox has not picked up a message, this may indicate that a given selection or de-selection did not work, and thus an indication may be provided to the user. This validation may be done separately or in combination with the library checking routine. This completes the initialization.

The various run-time processes of the Global_Registry and System_Main are now described. According to the present invention, a "map" of the configuration of component model instances specified by the user is maintained. This enables the infrastructure to communicate to each instance its particular "view" of the overall system configuration. AS previously described, during initialization, System_Main alerts the specific component models that they are part of the current experiment and specifies the particular "location" of each instance of each component model in the desired configuration. When a component has one or more instances in the desired configuration, it needs to maintain a "map" of where each of its instances exist in the interconnected set of discrete components. For every instance specified in the desired configuration, the component model maintains a data structure that specifies the next step (which must be a neighboring component instance) in the "path" to every other component instance in the desired configuration.

For example, given the following configuration:

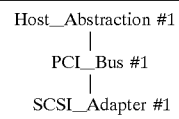

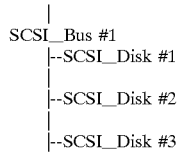

```
        SCSI_Bus #1
         |--SCSI_Disk #1
         |
         |--SCSI_Disk #2
         |
         |--SCSI_Disk #3
``` the "map" for SCSI_Adapter #1 should contain the following information:

| Destination | Next Step (Neighbor) |
|---|---|
| Host_Abstraction #1 | PCI_Bus #1 |
| PCI_Bus #1 | PCI_Bus #1 |
| SCSI_Bus #1 | SCSI_Bus #1 |
| SCSI_Disk #1 | SCSI_Bus #1 |
| SCSI_Disk #2 | SCSI_Bus #1 |
| SCSI_Disk #3 | SCSI_Bus #1 |

In this way, each instance of each component that is part of the desired configuration has its own personal "map" for initiating communications with any other component instance in the desired configuration.

A simple lookup routine is provided in Global_Registry and is used to access the data structure to determine the appropriate "neighbor" with which to communicate given a specific target component instance. To enhance efficient usage of memory, this map may be "compressed" to reduce its impact on overall simulation performance.

In particular, for large configurations, separately keeping track of the path to every instance of every component in the desired configuration is expensive in terms of memory. As most components only have a small number (e.g., 1–16) of neighbors, much of this information is repetitious. Furthermore, it is often the case that the path (neighbor component instance) from a given instance of one component is the same for every instance of a second component. In the example above, all three of the SDSI_Disk instances are reached from SCSI_Adapter #1 via SCSI_Bus_#1. Therefore, the data structure holding the "map" can be compressed significantly by storing the "path" information for ranges of component instances. The above example is then compressed as follows:

| Destination | Next Step (Neighbor) |
|---|---|
| Host_Abstraction #1 thru #1 | PCI_Bus #1 |
| PCI_Bus #1 thru #1 | PCI_Bus #1 |
| SCSI_Bus #1 thru #11 | SCSI_Bus #1 |
| SCSI_Disk #1 thru #3 | SCSI_Bus #1 <<<= =3 lines in one |

Given the typical hierarchical configuration of computer system components, the number of "entries" in the "map" of each component instance will often be only slightly larger than the number of unique components in the desired configuration (rather than the number of component instances).

Generalizing, the user-specified system configuration identifies not only which component models are included in the first set and how many instances of each component model are required, but also how each instance in each component model is "connected" to one or more other instances. In other words, the user-specified system configuration contains the set of desired "connections" between all instances of component models of the first set. Any two component model instances that are "connected" are able to communicate with each other directly; any two instances that are not "connected" only communicate through intermediary component model instances. "Communication" between component model instances refers to the passing of information between instances. This information may be for initialization purposes (i.e. prior to a simulation run), or it may represent activity occurring between component model instances during the run itself.

According to the invention, a data structure is thus generated for each instance of a discrete component model. The structure comprises a table of entries, with the number of entries equal to the number of instances of all component models of the first set (the selected set) a excluding the instance of the component model for which the data structure has been created. Each instance of all component models of the first set (excluding the instance of the component model for which the data structure has been created) thus will have a corresponding entry in the table. The table enables appropriate communication between different instances of component models in the set of models selected to form the system configuration. Each entry is a potential "target" of communication prior to or during a simulation run. For entries corresponding to "connected" component model instances, the entry identifies that same "connected" component model and the instance number. This signifies that the component model instance for which the data structure was created may communicate directly with the component model instance corresponding to the entry, since they are "connected." For entries corresponding to component model instances that are not "connected," the entry identifies the appropriate "connected" component model instance (if any) that will function as an intermediary to enable communication with the component model instance corresponding to the entry. Continuing the example above, SCSI_Bus #1 acts as an intermediary for communication between SCSI_Adapter #1 and the three (3) SCSI_Disks.

Compression is achieved by reducing the number of entries in a component model instance's data structure by combining entries that contain similar information so that an entry may correspond to a number of "target" component model instances. In other words, instead of a one-to-one relationship between entries and potential "targets" of communication (i.e. other component model instances), a one-to-many relationship may exist between entries and "targets."

Figure 9:
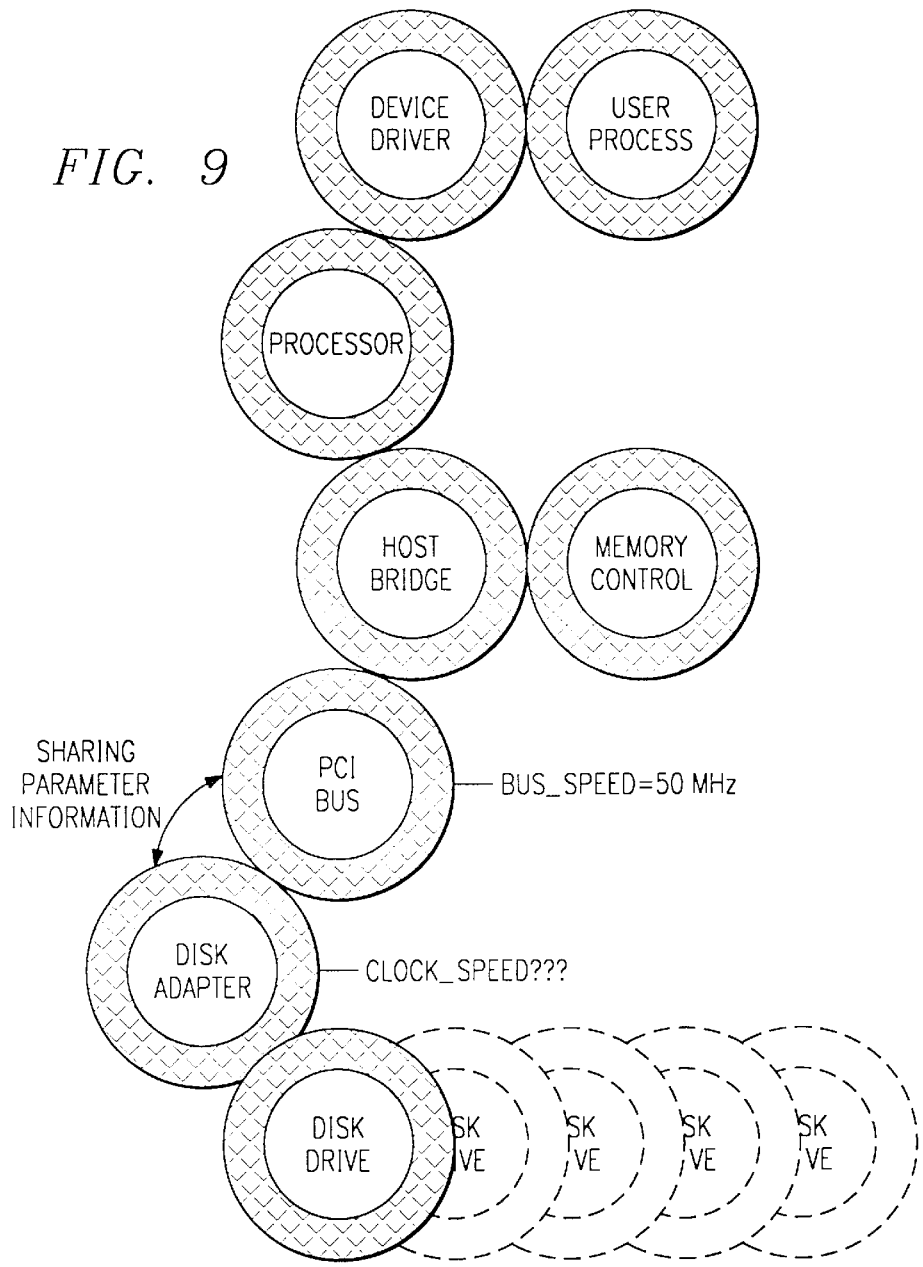
FIG. 9 is a block diagram illustrating a technique for finalizing connections between neighbors and reducing the number of redundant parameters among component models.

When running a simulation, there may be parameters that are "shared" between separate components. For example, a bus controller often runs its clock at the same speed or some multiple of the speed of the bus itself. Rather than having to specify such parameters multiple times when configuring independent component models, the infrastructure provides a mechanism to specify this information once without adding unnecessary dependencies between models. Before starting the actual simulation run, each component instance may communicate with its "neighbors" in order to obtain values for parameters that have not been explicitly specified by the user for the component model in question. Continuing the above example, and as illustrated in FIG. 9, a Bus Controller model instance receives information on its internal clock speed by exchanging pre-simulation information with the adjoining Bus model instance.

In a multi-component model with many instances, it is often the case that the destination of a communication from a given component model instance is often an adjoining ("neighbor") component model instance. Therefore, according to the invention, the infrastructure provides yet another mechanism to enable each component model to maintain additional mapping information (in the form of another or "second" data structure) about an adjoining component model. Each component model builds its own personal map of the entire configuration, so it may communicate with any other component instance (using a valid series of "hops" from one connected model instance to another). As most communication typically occurs between neighbors, this mechanism "caches" information associated with neighbor component instances rather than looking such information up in the complete "map" each time. In addition, special configuration information may be passed between neighbors either before or during a simulation. The cache of neighbor information can be augmented with such special configuration information.

During run-time, and after transferring information between components, it may be necessary to re-synchronize the "clocks" of the individual models. This is especially the case when the clock precision is not sufficient to capture the full time value and the individual models have been given or have calculated a "completion time" separately. This problem is addressed by providing a mechanism whereby one model is given the power to issue "completion" messages to all other models involved in the specific transfer (or at least those requiring synchronization). The selection of a controlling component instance for a given transfer may be determined statically (i.e., before the simulation run) or dynamically (e.g., when the transfer begins). Thus, as illustrated in FIG. 10, although each model instance proceeds through the transfer as though its clock is the correct clock, each respective instance does not finalize the transfer until it receives (or sends, in the case of a single controlling model) a completion message.

Figure 10:
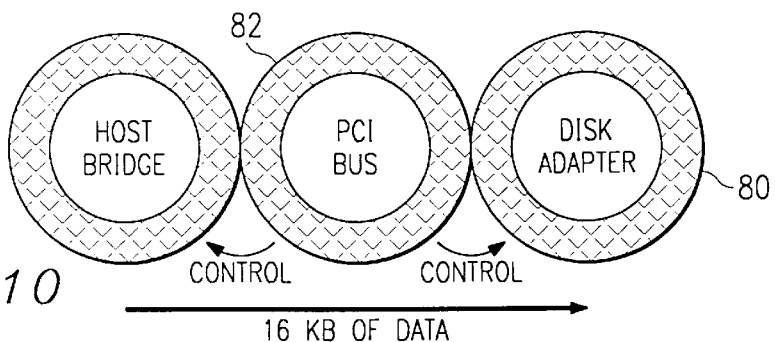
FIG. 10 is a block diagram illustrating synchronizing after transfer across multiple discrete component models according to the present invention.

For example, and as illustrated in FIG. 10, if a Disk Adapter model instance 80 is sending 16 KB of data over a PCI Bus model instance 82, and it knows that the current transfer will complete at time 16.325273, it can "empty" its buffers in a reasonable fashion until its clock reaches 16.325273, allowing other activities to make use of those resources as appropriate. However, the instance does not perform any completion processing (including, perhaps, the release of the final byte of buffer space) until it receives a message from the PCI Bus model instance 82 (the "controlling" model of this particular transfer) that the transfer is complete. This helps to eliminate race conditions and improves overall accuracy.

As noted above, in the preferred embodiment, the infrastructure takes advantage of a message-passing scheme, although this is not required. Individual component models could communicate with each other during initialization and run-time using, for example, broadcast methods. Message-passing, which is the preferred approach, is accomplished through the use of structured data packets and a global message "mailbox" or pool. The method of execution within the component modules is not covered by this invention, as what occurs within a given module is not visible to other components.

System component modules are designed to be independent, thereby preserving the "building-block" modeling methodology. The particular details of the system component models are beyond the scope of the present invention. The only exceptions to this primary rule are the System_Main module, which is responsible for initializing the individual components and connecting them in the desired configuration, and the Global_Registry module, whose various structures and resources are visible to all components. All other modules compiled into the executable may be included (or not) in the desired configuration or configurations undergoing analysis.

The methodology encourages the creation of modules at various levels of abstraction, although the user must also take care to make sure that the individual components can communicate appropriately for the chosen levels of abstraction. In addition to emulating discrete system components, the individual modules may be designed as workload generators, representing some abstraction of actual application or system activity that generates "work" for the model to perform. Component modules may also be designed to represent abstractions, such as a Disk Subsystem model, or a Host model that abstracts away the OS and application processes or perhaps the processors and memory. This is convenient for focusing on particular components (i.e., abstracting away the rest of the system), or for quick estimates (e.g., when prototyping), or when resources do not allow full-scale modeling of every component in the system. Given that the time scale changes dramatically when traversing the path from processor to secondary storage, modeling efficiency will often require that one "end" or the other of the system be abstracted to some degree.

The methodology of the present invention provides for runtime configuration flexibility. Both the configuration of the individual components and their interconnection is specified at runtime. As long as any system component module that may be required is linked into the executable file, the user is free to reconfigure the components or their interconnection between simulation runs. The invention further envisions linking-in object files without source code. This ensures confidentiality over the actual workings of a given component while providing an excellent "black-box" component model for inclusion in larger system models, thereby protecting intellectual property rights.

AS noted above, the system modeling infrastructure is implemented in software executable on a computer. A representative computer is an IBM RISC System/6000 computer (a reduced instruction set of so-called RISC-based workstation) running the AIX (Advanced Interactive Executive Version 4.1 and above), or an Intel-based processor system running the Windows NT or OS/2® operating system. The computer includes a graphical user interface (GUI) for management and administration including user-specified entry of the desired system configuration(s). The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system combinations may be used. Thus, for example, suitable alternative machines include: an IBM-compatible PC 486 or higher running Novell Unixware 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3.

As the modeling infrastructure is preferably software, one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention provides numerous advantages over the prior art. An arbitrary number of component models are linked into a single executable. Each component model is uniquely identifiable (e.g., given a unique i.d., preferably an integer) in a manner that does not necessitate a recompile every time a new component is added or an old component is deleted. During run-time, individual components "address" each other uniquely without imposing any dependencies between models. Thus, for example, a component model of a disk drive does not need to know the identifier of the peripheral bus model that it will be "attached" to during the run-time simulation. The independent component modules are connected to create more complex, multi-component system models.

Having thus described our invention, what we claim as new and desire to secure by letters patent is set forth in the following claims:

What is claimed is:

1. A method of simulating a complex physical system using a plurality of discrete component models each conforming to an interface specification, comprising the steps of:
   in response to user-selection of a system configuration to be modeled, selecting a first set of discrete component models necessary to model the system configuration;
   establishing a global addressable data structure associated with the set of discrete component models; and
   during a simulation, posting messages to and receiving messages from the global addressable data structure to enable communications among the set of discrete component models.

2. The method as described in claim 1 further including the step of verifying selection of the discrete component models prior to running the simulation.

3. The method as described in claim 2 wherein the step of verifying determines whether the discrete component models of the first set have unopened messages in the global addressable data structure.

4. The method as described in claim 1 further including the step of de-selecting a second set of discrete component models not necessary to model the system configuration prior to running the simulation.

5. The method as described in claim 1 wherein each discrete component model of the first set has a unique address in the global addressable data structure.

6. The method as described in claim 5 wherein the unique address is assigned to the discrete component model during a registration process.

7. A method of simulating a complex physical system using a plurality of discrete component models each conforming to an interface specification, comprising the steps of:
   in response to user-selection of a system configuration to be modeled, selecting a first set of discrete component models necessary to model the system configuration and de-selecting a second set of discrete component models non necessary to model the system configuration;
   establishing a global mailbox associated with the first set of discrete component models; and
   during a simulation, posting messages to and receiving messages from the global mailbox to enable communications among the set of discrete component models of the first set.

8. The method as described in claim 7 wherein each discrete component model of the first set has a unique address in the global addressable data structure.

9. The method as described in claim 8 wherein the unique address is assigned to the discrete component model during a registration process.

10. A computer program product in a computer-readable medium for use in a computer to simulate a complex system using a set of discrete, independent component models each conforming to a predefined interface, the computer program product comprising:
    means responsive to user-selection of a system configuration to be modeled for selecting a set of discrete component models necessary to model the system configuration;
    means for maintaining a global mailbox accessible to all discrete component models of the set; and
    means operative during a simulation for posting messages to and receiving messages from the global mailbox to enable the set of discrete component models to communicate with each other.

11. The computer program product as described in claim 10 further including means for assigning each discrete component model an address in the global mailbox prior to the simulation.

12. The computer program product as described in claim 10 further including means for verifying selection of the discrete component models prior to running the simulation.

13. The computer program product as described in claim 12 wherein the verifying means determines whether the discrete component models of the first set have unopened messages in the global mailbox.

14. A computer, comprising:
    a processor;
    an operating system;
    means for generating a complex system model using a selected interconnected set of discrete, independent component models each conforming to a predefined interface; and
    means for maintaining a global mailbox accessible to all discrete, independent component models of the interconnected set; and
    means, operative during a simulation, for posting messages to and receiving messages from the global mailbox to enable the discrete component models to communicate with each other.

15. The computer as described in claim 14 further including means for assigning each discrete component model an address in the global mailbox prior to the simulation.

16. The computer as described in claim 14 further including means for verifying selection of the discrete component models prior to running the simulation.

17. The computer as described in claim 16 wherein the verifying means determines whether the discrete component models of the first set have unopened messages in the global mailbox.

18. The computer as described in claim 14 wherein connection instances of discrete component models communicate with each other using the global mailbox during the simulation to exchange common parameters.

19. The computer as described in claim 14 wherein connection instances of discrete component models communicate with each other using the global mailbox during the simulation to verify compatibility.

* * * * *

UNITED STATES PATENT AND TRADEMARK OFFICE
CERTIFICATE OF CORRECTION

PATENT NO : 5,881,270
DATED : March 9, 1999
INVENTOR(S) : Worthington et al.

It is certified that error appears in the above-identified patent and that said Letters Patent is hereby corrected as shown below:

On the title page at [54], line 4, delete "COMMUNICATION" and substitute --COMMUNICATIONS--
In the specification, Column 1, line 4, "COMMUNICATION" and substitute --COMMUNICATIONS--
In the specification, Column 4, line 64, after independently, insert --therefor--
In the specification, Column 12, line 32, delete "AS" and substitute --As--

Signed and Sealed this

Sixteenth Day of January, 2001

*Attest:*

Q. TODD DICKINSON

*Attesting Officer*     *Commissioner of Patents and Trademarks*